(12) United States Patent
Duncan et al.

(10) Patent No.: US 9,328,499 B2
(45) Date of Patent: May 3, 2016

(54) DEVICE FOR SETTLEMENT OF PARTICLES FROM A LIQUID

(71) Applicants: Gregory Stephen Duncan, Allentown, PA (US); Hans de Bruijn, Lancaster, PA (US)

(72) Inventors: Gregory Stephen Duncan, Allentown, PA (US); Hans de Bruijn, Lancaster, PA (US)

(*) Notice: Subject to any disclaimer, the term of this patent is extended or adjusted under 35 U.S.C. 154(b) by 240 days.

(21) Appl. No.: 13/776,909

(22) Filed: Feb. 26, 2013

(65) Prior Publication Data
US 2013/0292315 A1 Nov. 7, 2013

Related U.S. Application Data

(60) Provisional application No. 61/603,393, filed on Feb. 27, 2012.

(51) Int. Cl.
*E03F 5/04* (2006.01)
*E03F 1/00* (2006.01)
*B01D 17/02* (2006.01)
*B01D 21/00* (2006.01)
*E03F 5/046* (2006.01)

(52) U.S. Cl.
CPC .............. *E03F 1/00* (2013.01); *B01D 17/0211* (2013.01); *B01D 21/0045* (2013.01); *E03F 5/0403* (2013.01); *E03F 5/0404* (2013.01); *E03F 5/046* (2013.01)

(58) Field of Classification Search
CPC ....... E03F 5/0403; E03F 5/0404; E03F 5/046; E03F 5/101; B01D 17/0211; B01D 21/0012; B01D 21/0045
USPC ............... 210/305, 307, 521, 522, 532.1, 538
See application file for complete search history.

(56) References Cited

U.S. PATENT DOCUMENTS

| | | | |
|---|---|---|---|
| 3,706,384 A | | 12/1972 | Weijman-Hane |
| 4,132,651 A | * | 1/1979 | deJong .......................... 210/522 |
| 4,213,865 A | * | 7/1980 | Wagner .......................... 210/522 |
| 5,228,983 A | * | 7/1993 | Nims ........................ 210/170.03 |
| 6,428,692 B2 | | 8/2002 | Happel |
| 6,676,832 B2 | * | 1/2004 | de Bruijn et al. ......... 210/170.03 |
| 6,797,162 B2 | | 9/2004 | Happel |
| 7,011,743 B2 | * | 3/2006 | Use et al. ....................... 210/521 |
| 7,153,417 B2 | | 12/2006 | Happel |
| 7,294,256 B2 | | 11/2007 | Happel et al. |
| 7,718,056 B2 | * | 5/2010 | Bonnerup ................. 210/170.03 |
| 2006/0157405 A1 | * | 7/2006 | Thacker et al. ........... 210/500.23 |
| 2007/0095749 A1 | * | 5/2007 | Komatsu ........................ 210/513 |
| 2009/0101555 A1 | * | 4/2009 | Scarpine et al. .......... 210/170.03 |
| 2009/0114577 A1 | * | 5/2009 | Duncan .......................... 210/137 |
| 2010/0122954 A1 | * | 5/2010 | Rodriguez-Jovet ......... 210/532.1 |

\* cited by examiner

*Primary Examiner* — Christopher Upton

(57) ABSTRACT

An object of this invention is to provide an improved means of water treatment effectiveness. The invention strips floating and sinking particulates from flowing water with netting and inclined settling cells, which are arranged in an overlapping fashion to save treatment space. The effluent invert is virtually level with the influent invert to minimize pressure loss. The device pre-treats water for further treatment by filtering methods and among other application is ideally suited for applications where low depth profile treatment is beneficial or required.

4 Claims, 3 Drawing Sheets

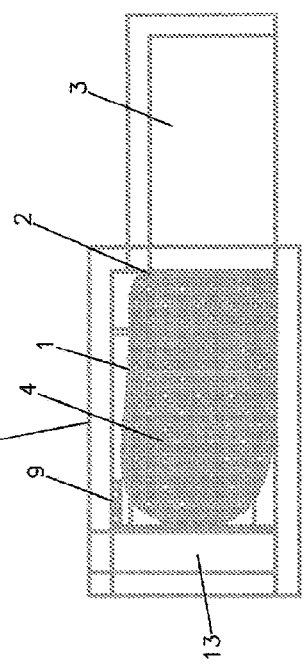
FIG. 2A
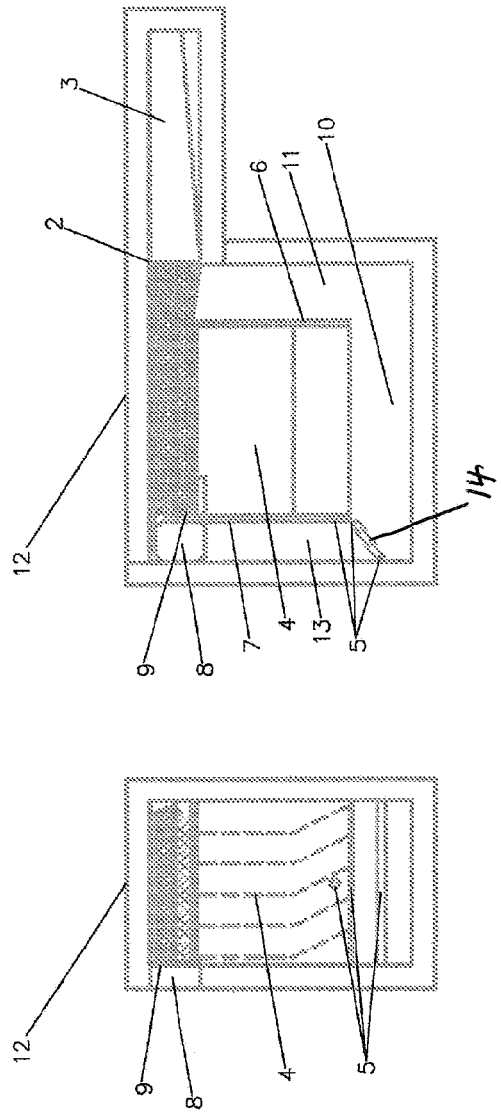
FIG. 2B
FIG. 2C

DEVICE FOR SETTLEMENT OF PARTICLES FROM A LIQUID

CROSS-REFERENCE TO RELATED APPLICATIONS

This application claims the benefit of U.S. Provisional patent application Ser. No. 61/603,393 filed Feb. 27, 2012.

BACKGROUND OF THE INVENTION

1. Field of the Invention

This invention relates to improvements in the field of land development, particularly with water quality treatment and volume reduction of storm water runoff by retention, infiltration, evapo-transporation as is commonly required when constructing new areas or revitalizing/reconstruction of already developed areas. These water quality and volume removal features fall into a class of facilities referred to as best management practices or "BMPs". Some common representation of BMP facilities include but are not limited to: biorention cells, infiltration trenches, constructed wetland, detention basin, retention basins, et al. BMPs are sometimes also referred to as "green infrastructure".

The subject of water quality treatment and volume removal of storm water is of interest to those looking to attain construction permits from a county, state or federal entity such as the Environmental Protection Agency or any other organization or entity charged with the protection of environmental resources. Another reason for construction of green infrastructure would be to reduce additional storm water runoff volume from entering a combined sewer. Combined sewers is a term describing collection and conveyance systems within an urban or suburban area may collect runoff from rainfall events as well as sanitary discharges from residences or businesses into a single conveyance, which would then be directed to a waste water treatment plant (WWTP). Combined sewers are still a common practice in older urban areas. In many cases with urbanized areas, the benefit with using BMPs or "green infrastructure" would be as a means of reducing sewer operation fees, which are typically proportional to whatever volume of influent (flow in) would be to a waste water treatment plant (whether or not this influent would be sewage or rainwater). In particular, the application of the device described herein relates to the pretreatment of storm water runoff before entry into green infrastructure areas; a necessary step in order to ensure the longevity and viability of these planted zones, that also serve the function of infiltrating storm water volume in lieu of discharge into combined sewers or steams.

2. The Prior Art

Pretreatment of storm water runoff into green infrastructure or BMPs is known to be an important step in providing for the long term function and operation of urban green infrastructure is to be maintained in a cost effective way. A green infrastructure facility that is not outfitted with a means of pretreatment may undergo scouring or loss of stabilization and plant matter, its planting zone may be overwhelmed with trash and debris, its soil may become clogged with fine sediment rendering its purpose as an infiltration facility useless, excessive oil and heavy metals may kill plant growth especially in urban areas where green infrastructure would more readily encounters such pollutants.

Current practices include the use of fabric or small diameter stone to provide pretreatment by screening pollutants and trash. Some attempts at a manufactured solution have been the use of screens to filter out trash and sediment. However, due to the small cross-sectional flow area presented by these various screening methods, these types of configurations quickly clog and render not only the means of pre-treatment useless, but potentially the whole BMP facility.

prior art teaches nets be used to capture trash from the flow of water from pipes. Prior art also teaches inclined cells be used to efficiently settle sediment from the flow of water. This invention introduces the combination of both technologies in a stacked fashion. This is possible with the reversal of the traditional flow path in the settling cells. Prior art teaches the flow inside the settling cell to be substantially upward, i.e. From the bottom to an overflow weir. This invention teaches a method where the water flows from the top of the settling cells to orifices below the water surface and thus the water is substantially flowing downward. This method has shown to promise remarkable results in test models. The deterministic flow regime of flowing substantially with the direction of gravity proves to enhance the inherent settling direction of the sediment on the cell bottoms and the subtle directional change of the hydraulic flow toward an escape orifice as well as the eddy current in the settling cells all contribute to the separation of sediment from the water flow in this device. Because this device departs from traditional settling regimes claimed in U.S. Pat. Nos. 3,706,384 and 6,676,832 and substantially improves settling efficiency of the Happel et al U.S. Pat. Nos. 6,797,162; 6,428,692; 7,153,417; 724,256 where settling cells operate in series instead of in parallel and do not provide the overlapping features of the settling cells. This invention places a screening or netting surface above a cell settler and among other enhancement this device is new in its form and promises to be compact, cost effective and useful to the implementation of pretreatment of storm water run-off dedicated for evaporation and infiltration in green infrastructure designs, as well as being useful in other circumstances were treatment or cleaning of a liquid is required.

SUMMARY OF THE INVENTION

In view of the foregoing discussion, an object of this invention is to provide an improved storm water pre-treatment device that is currently lacking in the field of drainage and stormwater design.

Another object of this invention is to provide a pre-treatment device that would fit in a narrow (slender) profile, required for effective incorporation into an urban settings where green space area is limited, and where infiltration/plant growth beds cannot be set too deep due to their need for adequate sunlight.

According to a preferred embodiment of the invention, an improved inlet/pre-treatment apparatus comprising: (a) an intake feature; (b) a water quality treatment module comprised of baffle walls, lamina plates, netting, orifice plates arranged in such a way where a co-current flow regime would be established; that is to say, low flow situations would route over, under and through the baffles orifices and between lamina plates for a more effective treatment cycle, higher flows would be split between the more robust treatment mentioned for the low flow situation, as well as through a flow direction that would be treated by netting and some gross pre-treatment; (c) a compartment within the pre-treatment module that would capture oil spills, thus preventing the green infrastructure component (subsequent to the device) from being contaminated; (d) an optional, variable aperture feature that allows for the selection of different possible flow rates and reduction of scour and strain of plant material; (e)

aligned clean out openings in the lamina plates to access sediment below the assembly from top of the device enclosure.

As will be appreciated from the ensuing detailed description of a preferred embodiment, the invention affords the advantages of: 1) modularity (more easily repeatable results and ease of installation), the same type (model) of unit can be placed and adjusted for a wide range of situations 2) enhanced water quality and growth viability of planted areas within green infrastructure; by providing (a) complete screening of all trash and floatables influent to infiltrative BMP facilities (aesthetics); (b) less frequent need for remediation of infiltration beds affected by clogged soils (benefit provided by removal of a moderate amount of fines); (c) oil capture before introduction to planting zones, to promote improved growth environment for plants and beneficial bacteria; (d) lastly, protection of soil beds from scour through an adjustable flow rate control feature (optional offline/bypass regime); (e) minimal drop in elevation between inflow and outflow threshold.

The invention and its various advantages will become better understood from the ensuing detailed description of preferred embodiments, reference being made on the accompanying drawings in which like reference characters denote like parts.

BRIEF DESCRIPTION OF THE DRAWINGS

FIGS. 2A, 2B and 2C are side, front (profile) and top views, respectively, of a preferred embodiment, where storm water would be captured and directed through an interception box (trough). The captured water would then be directed through a debris net, and depending on the magnitude of flow be directed down through the sump of the box containing partial walls, plates and orifices; flow in excess of the capacity of the typical direction of flow would proceed through the net in the top compartment, still exhibiting a reasonable rate of treatment as trash and floatables would be captured by the net and fine sediment would still precipitate through the top of the lamella plates into the sump (lower compartment of the box) These plates are to be engineered to a lab-tested specification to develop various plates (orifice) options to accommodate a widely varying range of flows and sediment loads.

FIG. 1B is a top view is a schematic illustration of a storm water treatment system in which the invention is particularly useful. A representation of a drainage inlet structure, common in the practice of civil engineering drainage design is shown to illustrate the direction of runoff, in the event that flows excessive to the desired capacity of the box is reached.

DRAWING—REFERENCE NUMERALS

Figure 1A:
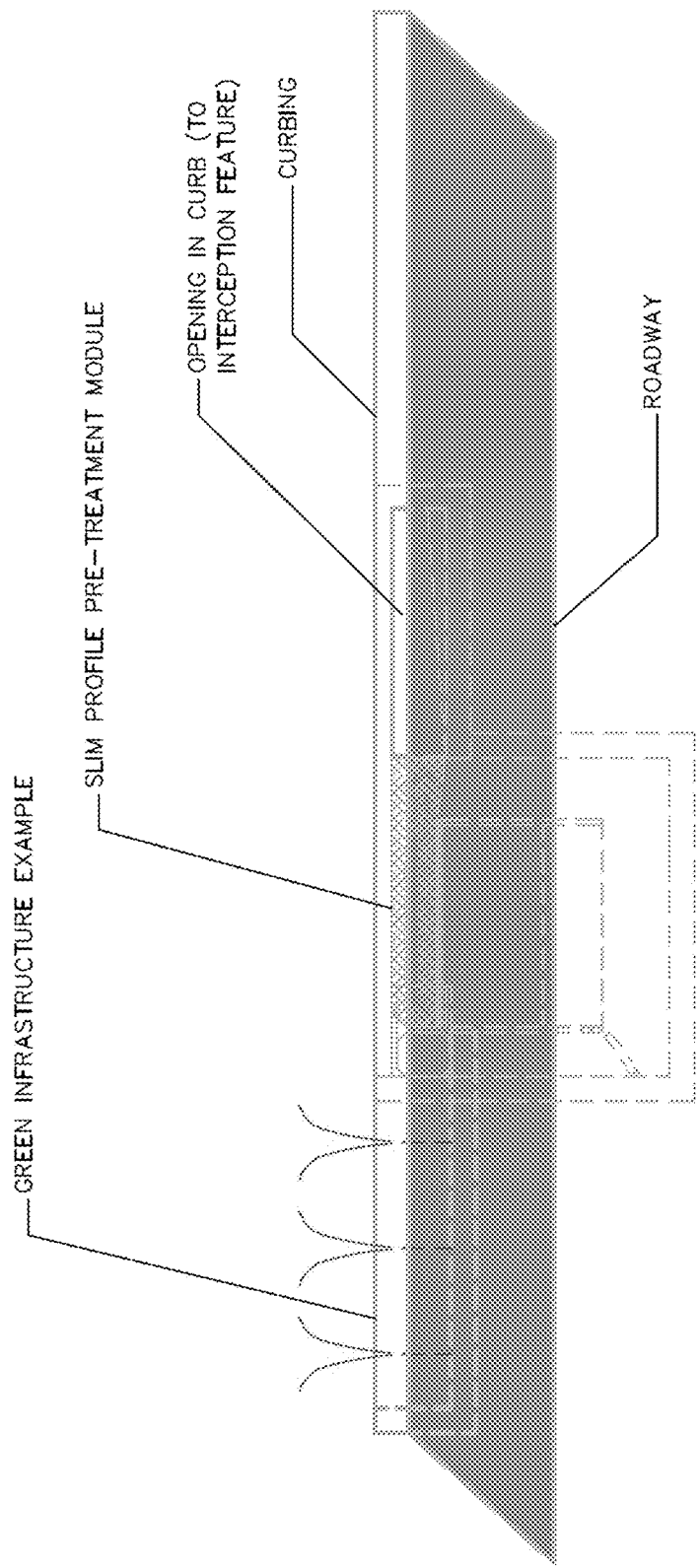
FIG. 1A is a schematic illustration of a storm water treatment system in which the invention is particularly useful; [apparatus embodying the invention; has been arranged collection of isometric views associated with the installation of the invention.
Figure 1B:
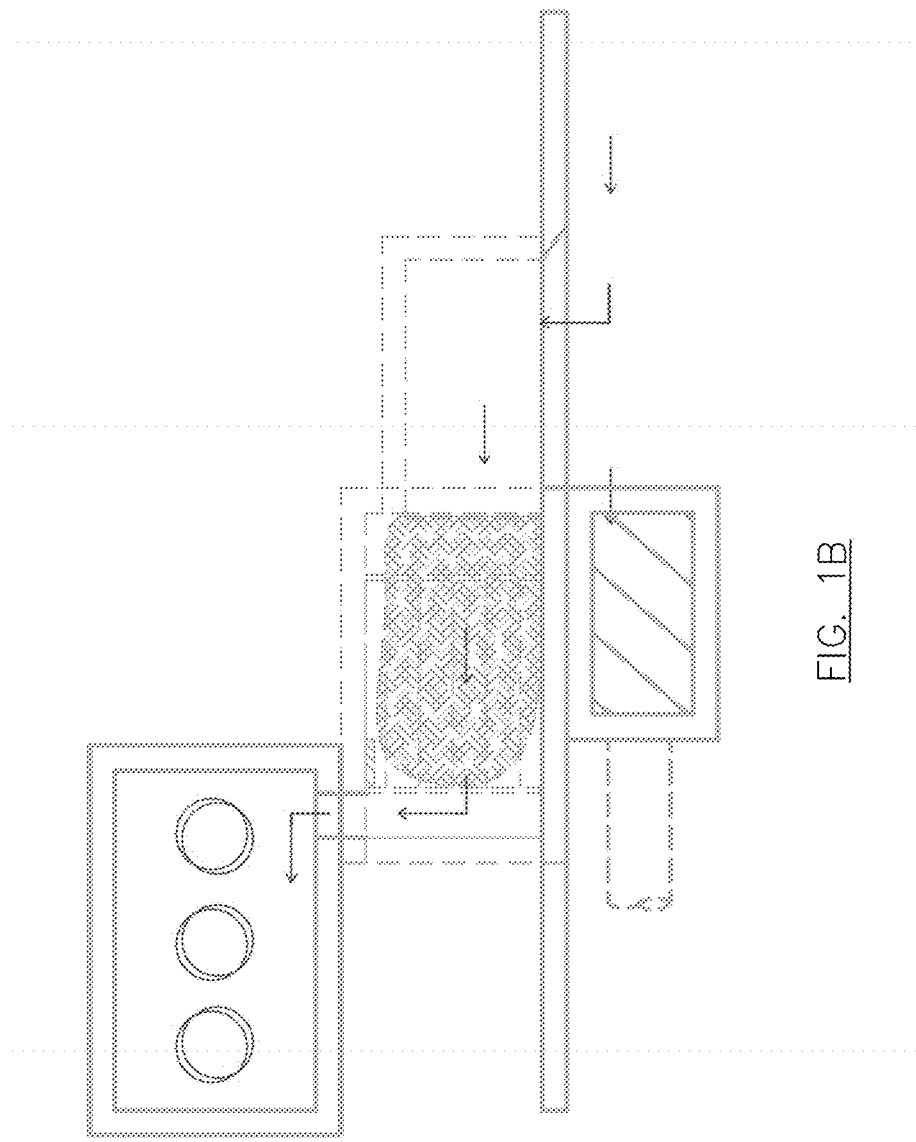
FIG. 1B (top-view of implemented device), in this incidence the device is shown being installed to intercept flow before a standard inlet drainage box. Installed in an enclosure, the invention is to be situated upslope of a standard inlet box, hence intercepting flow first to direct towards a green infrastructure BMP. The invention is to be fastened to the inside walls of an appropriate structure of suitable dimensions to accommodate said device. Two knock-outs or orifices are to be made in the box to allow a path of water into and out of the apparatus;]

1—Screening mesh and frame
2—Screening frame attachment point
3—Flow interception feature
4—Lamella plates
5—Orifices in wall 7 that release the flow between plates (lamellae)
6—Internal wall 'A'
7—Internal wall 'B'
8—Outlet
9—Adjustable flow restriction plate (as described in U.S. patent application publication no. 2009/0114577, Duncan)
10—Sediment storage sump
11—Oil trap
12—Enclosure
13—Effluent recombination chamber
14—Hinged self-closing effluent control and sediment removal access baffle.

DETAILED DESCRIPTION OF PREFERRED EMBODIMENTS

Referring now to the drawings, in FIG. 2A, FIG. 2B & FIG. 2C there is shown a pre-treatment device, having internal walls (6,7) by which lamella plates (4) are supported. As well as, a housing by which the screening net (1) and adjustable flow restriction plate (9) are supported.

All inflow must pass screening mesh and frame (1) and screening mesh openings (2)

In further detail, still referring to FIG. 2A, FIG. 2B & FIG. 2C, internal wall 'A' (6) also serves the purpose of providing a barrier to low fluid flow, by extending sufficiently higher than the invert of the interception feature (3) to direct dry weather flow down in front of Internal wall 'A' (6). In addition internal wall 'A' (6) provides volume storage for oil capture (11) by trapping lighter-than-water fluids between itself and the wall of the enclosure (12) which houses the apparatus.

In more detail, still referring to FIG. 2A, FIG. 2B & FIG. 2C, internal wall B' (7) also serves the purpose of providing a barrier to fluid flow, by extending higher than internal wall 'A' (6), the purpose of this is to direct the water quality treatment flow between the plates (4). Plates (4) are inclined and spaced at approximately 1 to 2 inch and approximately inclined at a 55 degree angle to the horizontal. The water quality flow is proportioned by the number of cell compartments formed by plates (4) and by the size of orifice (5) as to insure that the flow in each cell compartment preserves a flow stress that is equal in each compartment. This flow stress is expressed in flow per area of each cell bottom plate. The incoming fluid is encouraged to flow parallel to the plate surface in a substantially downward direction. Between the cell plates settlement and migration of sediment onto the lamellae plates (4) of the treatment system take place under the influence of gravity and density difference of the particulates and the water. Eventually sediment slides from the bottom plate surfaces into the sump (10) of the enclosure (12). The orifice openings (5) in internal wall 'B' (7) are located and sized to facilitate flow as a function of the pressure differential of the water in upstream of plate (7) and downstream of plate (7) and related to preserve equality in flow stress in each neighboring settling cell in proportion with the effective horizontal projection of the inclined portion of the plate(s) (4). Further the orifice is located in such a way that the bottom of the opening is elevated above the bottom plate (4) of a cells. Orifice (5) drains to the post-treatment cell (13).

In further detail, still referring to FIG. 2A, FIG. 2B & FIG. 2C, screening mesh and frame (1) being supported by and anchored by an attachment point (2) is attached to the outlet side at the interface of the flow interception feature (3) and the wall of the enclosure (12). The screening mesh and frame (1)

will be slid into pre-fabricated slots specifically designed to accommodate the dimensions of the net's hoop (2). Under this preferred embodiment, this would be the means for securing the screening mesh and frame.

In more detail, still referring to FIG. 2A, FIG. 2B & FIG. 2C, an adjustable flow restriction plate will be installed on the outlet feature (8), on the interior side of the enclosure's wall (12).

Referring now to FIG. 1A and FIG. 2B, a profile depth sufficient enough to accommodate fluid flow and treatment will be provided without any substantial vertical drop, such as about 8-18 inches from point of interception to point of discharge which would be considered reasonable.

The construction details of the invention as shown in FIG. 2B are that the enclosure may be made of concrete and the device may be made of metal or of any other sufficiently rigid and strong material such as high-strength plastic, and the like. Further, the various components of the device can be made of different materials.

While the invention has been described with reference to a particularly preferred embodiment, it will be appreciated that various variations and modifications may be made without departing from the spirit of the invention. Such changes are intended to fall within the scope of the appended claims.

CONCLUSION, RAMIFICATIONS, AND SCOPE

Accordingly the reader will see that, according to one embodiment of the invention, we have provided a better, more facilitative method of addressing pre-treatment of influent runoff being to green infrastructure.

While the above description contains many specificities, these should not be construed as limitations on the scope of any embodiment, but as exemplifications of the presently preferred embodiments thereof. Many other ramifications and variations are possible within the teachings of the various embodiments. For example (not to be considered as an exhaustive listing), if the device was fitted into another type of structure, such as a manhole or a high density plastic structure, or if only the elevated height of the internal walls (6, 7) i.e. "weirs" are used without lamella plates to create an inferior though still somewhat effective version of this device, or vice-versa, if lamellae are used without elevated walls (weirs), or if a different material is used in for any of the parts.

Thus the scope of the invention should be determined by the appended claims (to be provided) and their legal equivalents, and not by the examples given.

What is claimed as new and for which Letters Patent of the United States are desired to be secured is:

1. A water purifying catch basin comprising:
    an enclosure with a bottom and within the enclosure;
    a lamella separator; an oil trap; a sediment collection area above the bottom and below the lamella separator; an effluent recombination chamber; a screening mesh and frame substantially covering the lamella separator and oil trap;
    a water inlet permitting water to flow into the enclosure from outside the catch basin;
    a water exit permitting water to flow out of the catch basin from the enclosure, with the water exit located no higher above the bottom of the catch basin than the water inlet;
    a first internal wall between the lamella separator and the inlet creating the oil trap with a top of the first internal wall being above an inlet invert of the water inlet; and
    a second internal wall between the effluent recombination chamber and lamella separator provided with orifice openings to release purified water near the bottom of the lamella separator.

2. The catch basin of claim 1 further including at least two access holes in a top wall of the catch basin, the access holes located to permit cleaning out the accumulated material on the bottom and removal of the screening mesh and frame and contents.

3. The catch basin of claim 1 further including an adjustable orifice flow restriction plate operably associated with the water exit to allow selection of different flow rates out of the enclosure.

4. The catch basin of claim 1 further comprising a hinged baffle to close the effluent recombination chamber for flowing water below the lamella separator.

\* \* \* \* \*